J. BREWER.
Land Roller.
No. 82,793.
Patented Oct. 6, 1868.
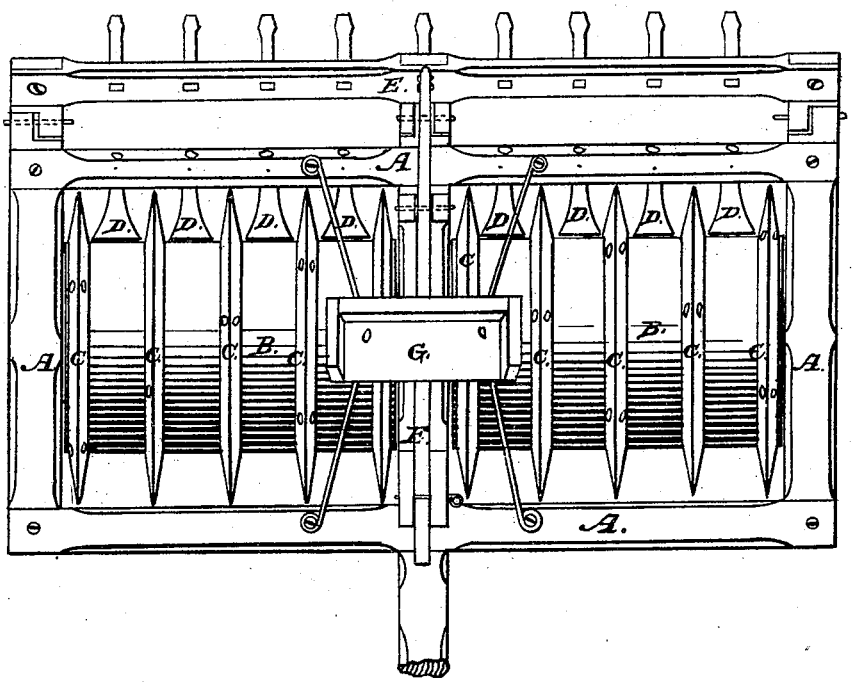
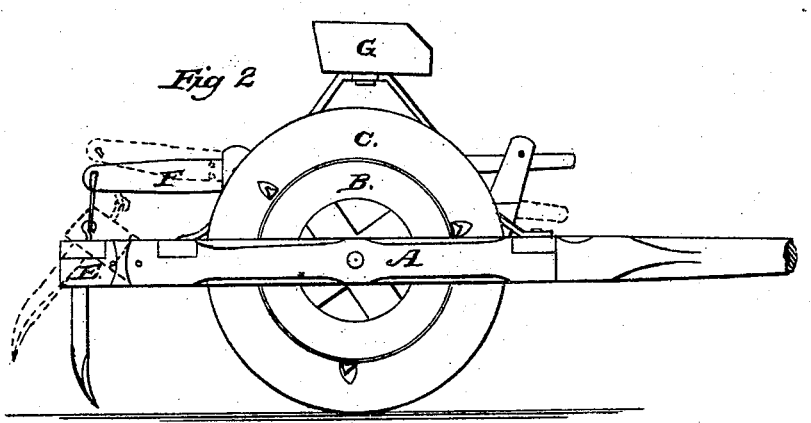

United States Patent Office.

JOHN BREWER, OF NEW VIENNA, OHIO.

Letters Patent No. 82,793, dated October 6, 1868.

IMPROVEMENT IN COMBINED LAND-ROLLER AND CLOD-PULVERIZER.

*The Schedule referred to in these Letters Patent and making part of the same.*

TO ALL WHOM IT MAY CONCERN:

Be it known that I, JOHN BREWER, of New Vienna, in the county of Clinton, and in the State of Ohio, have invented certain new and useful Improvements in Combined Land-Roller and Clod-Pulverizer; and do hereby declare that the following is a full, clear, and exact description thereof, reference being had to the accompanying drawings, and to the letters of reference marked thereon.

The nature of my invention consists in the construction and arrangement of two drums or cylinders on which iron knives or cutters are placed, and in providing the frame to which said cylinders are attached with a movable and adjustable cultivator, so that this machine will roll the ground and cover the seed at the same time, and leave the surface smooth and even for harvesting.

In order to enable others skilled in the art to make and use my invention, I will now proceed to describe its construction and operation, referring to the annexed drawings, which form a part of this specification, and in which—

Figure 1 is a plan view, and

Figure 2 is a side section.

A represents a frame, of any material and dimensions desired, in which frame two drums or cylinders, B B, are placed.

The object of two drums is to make the roller easier turned and on less space than if the whole were but one single drum.

Around each drum or cylinder, and at proper distances from each other, are placed iron knives or cutters, c c, so that the roller in revolving cuts up the clods into smaller particles, while the roller thoroughly pulverizes them, and leaves the ground over which it has passed in a loose and mellow condition.

The knives or cutters are kept clean and free from any clogging by cleaners D D, placed between each of the knives projecting from the back cross-beam of the frame.

In rear of the frame of the roller is attached a cultivator, E, in such a manner that the same can be removed from or adjusted to said roller at pleasure, and it is further so adjusted that it can be lifted from the ground in turning or in overcoming obstacles by means of a foot-lever, F, which extends forward in front of the driver's seat, G.

Having thus fully described my invention, what I claim as new, and desire to secure by Letters Patent, is—

The drums B B, provided with knives C C, in combination with the cultivator E, when constructed and operating substantially as and for the purposes herein set forth.

In testimony that I claim the foregoing, I have hereunto set my hand and seal, this 3d day of June, 1868.

JOHN BREWER. [L. S.]

Witnesses:
C. C. BOWERS,
J. A. GRAVATT.